Dec. 12, 1939. P. E. KÖSTER Re. 21,295
REGULATOR FOR AIRCRAFT DRIVING GEARS
Original Filed April 18, 1935
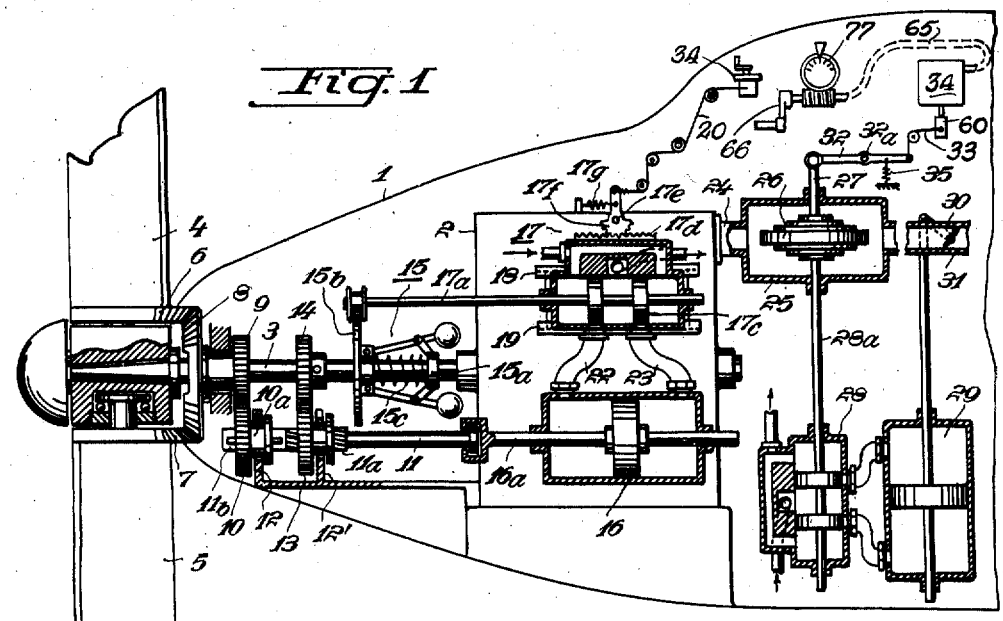
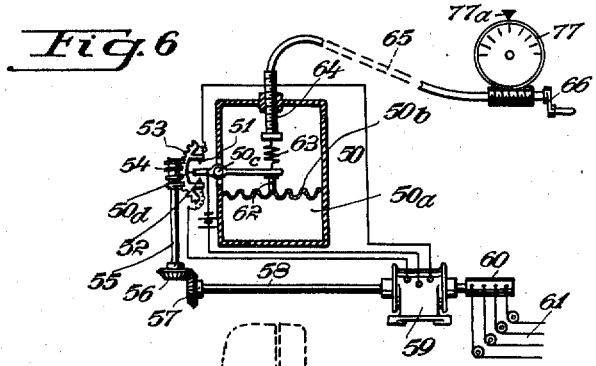
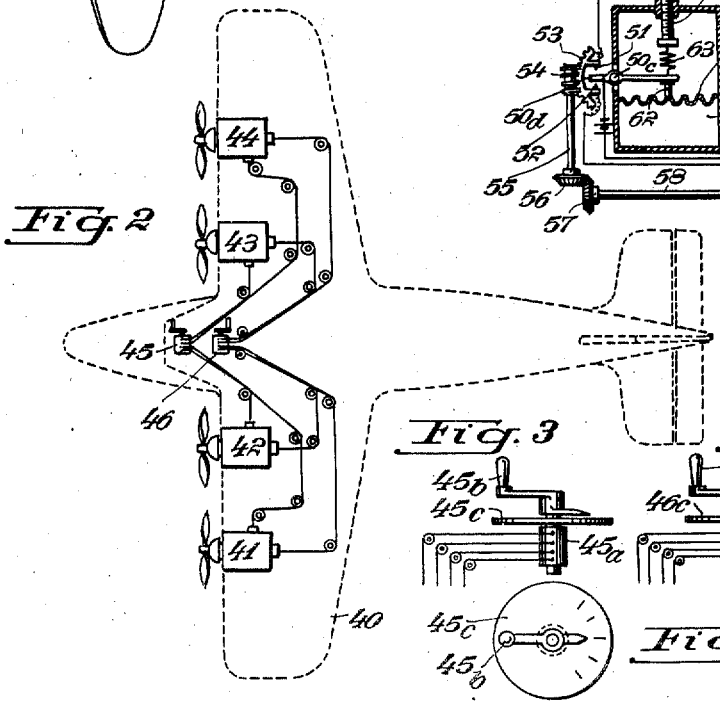
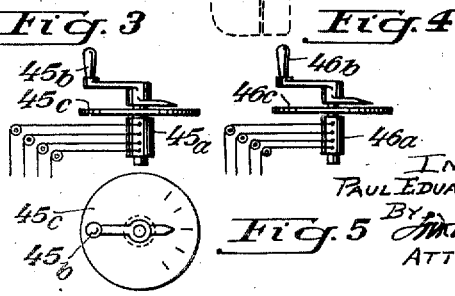
INVENTOR
PAUL EDUARD KÖSTER
BY
ATTORNEYS.

Reissued Dec. 12, 1939

Re. 21,295

UNITED STATES PATENT OFFICE 21,295

REGULATOR FOR AIRCRAFT DRIVING GEARS

Paul Eduard Köster, Berlin, Germany, assignor to Siemens Apparate und Maschinen G. m. b. H., Berlin, Germany, a corporation of Germany Original No. 2,112,965, dated April 5, 1938, Serial No. 17,049, April 18, 1935. Application for reissue June 14, 1939, Serial No. 279,105. In Germany April 19, 1934

12 Claims. (Cl. 244—76)

My invention relates to aircraft power plants and, more particularly, to means for regulating the power plant of an aeroplane having an internal combustion engine and a variable pitch propeller driven by the engine.

According to the invention the power plant is provided with a governor for maintaining the internal combustion engine at a constant speed by varying the pitch of the propeller, and a regulaor for maintaining constant the charging pressure of the fuel supplied to the engine, in connection with means for setting the regulating value of the speed governor and/or of the charging pressure regulator.

By charging pressure is understood the intake pressure in front of the cylinder valves of the engine, that is to say, the pressure at which the gas mixture is supplied from the carburettor to the cylinders of the driving engine. Regulators for regulating this charging pressure are well known in the art and as the details of these devices are not in themselves part of my invention the description thereof is limited to what is necessary in order to make the invention of this application understood. Also governors are well known which vary the angle of attack of the controllable propeller in accordance with suitable magnitudes, for instance, with the speed, so as to maintain constant said regulating magnitude, i. e., for instance, the speed. The invention does not, therefore, lie in the constructive details of the governor or regulator under consideration, not even in the use of either the governor or the charging pressure regulator, but rather in the provision of a regulating device for the power plant of an aeroplane by combining the speed governor and the charging pressure regulator.

The advance attained thereby will be apparent from the following considerations. The power of an aeroplane engine is substantially determined by the speed and the charging pressure. If, consequently, the speed and the charging pressure are maintained constant, the power of the engine will, therefore, also remain constant during the period that the speed and the charging pressure are maintained constant. It is thereby possible to operate by means of the novel regulating device in all attitudes of flight with a constant power of the engine. With the novel regulating device it is possible to prevent the power plant, irrespective of the attitude of flight, from being loaded beyond the above-mentioned constant power value. If the mentioned power value is the maximum power of the engine, the novel regulating device, consequently, permits of utilizing the power plant at maximum load without, however, running the risk of overloading the engine, for instance, owing to a change of the attitude of flight. This is very important both in civil and military aeronautics. Particularly, in the last-mentioned case an overload must at all events be prevented. On the other hand, there is also a great interest in utilizing always the permissible maximum load. The engine with the aid of the regulating device is at all heights stressed at the desired power uniformly and, under circumstances, in accordance with the adjustment of the speed governor and charging pressure regulator when the aeroplane takes off, climbs, flies at high speeds and at certain accelerated flying attitudes.

The novel regulating device may also be employed to advantage, particularly in connection with multi-engined aeroplanes.

With certain types of known automatic control devices the driving gear is regulated in accordance with the height of flight measured, for instance, with a barometer, so as to maintain the adjusted height of flight at a constant value. According to the invention this result is accomplished by adjusting the regulating value to be maintained constant by the charging pressure regulator in accordance with an instrument for indicating the height of flight.

Further details of the invention will be apparent from the following description taken in connection with the acocmpanying drawing in which Fig. 1 shows an embodiment of the regulating device according to the invention;

Fig. 2 shows a multi-engined aeroplane whose engines are equipped with the novel regulating device, the adjustment of the regulating values to be maintained constant by these regulating devices being effected from a central point;

Fig. 3 shows a top view of one of the regulating devices of the embodiment shown in Fig. 2;

Fig. 4 illustrates a top view of the second regulating device of the embodiment shown in Fig. 2;

Fig. 5 shows a front elevational view of the regulating device according to Fig. 3 or Fig. 4;

Fig. 6 illustrates in detail one of the adjusting devices shown in Fig. 1.

Referring to Fig. 1, 1 denotes the aeroplane. 2 is the aero-engine with the shaft 3. A head 3a on which the controllable propeller blades 4 and 5 are rotatably mounted is secured to the front end of the shaft.

Each propeller blade is provided with a bevel gear segment as shown at 6 and 7 respectively. Both bevel gear segments 6 and 7 are in engagement with a bevel gear 8 rotatably mounted on the engine shaft 3. The bevel gear 8 is connected to rotate in unison with a gear 9 meshing with a gear 10. The gear 10 is so arranged on the shaft 11 with the aid of a wedge or feather 11b extending through a groove of the hub of the gear 10 that it revolves together with the shaft 11, the latter being capable of sliding in its longitudinal direction relatively to the gear 10. The gear 10 is prevented from shifting in the longitudinal direction of the shaft 11 by a flanged collar 10a and a bearing bracket 12. The shaft 11 is provided with a thread having a steep pitch as shown at 11a. At this point the gear 13 whose hub is provided with an internal thread corresponding to the thread 11a is mounted on the shaft 11. The gear 13 is held in such a manner by a flanged collar 13a and a bearing bracket 12' as to prevent it also from being shifted in the longitudinal direction of the shaft 11. A longitudinal displacement of the shaft 11 only causes, owing to the thread 11a, a rotation of the gear 13 relatively to the shaft 11. The gear 13 meshes with a gear 14 firmly mounted on the engine shaft 3.

The operation of the parts so far described is as follows:

Assuming that the shaft 3 rotates with any speed whatever, the revolving movement is transmitted through the gear 14 and the gear 13 to the shaft 11 and then to the gear 9 through the gear 10. The gears 14 and 9 have a ratio of 1:1. Consequently, the gear 9 revolves with the same speed with which the gear 14 rotates and, therefore, with the same speed as the engine shaft 3. The bevel gear 8 is, therefore, not rotated relatively to the shaft 3 and, consequently, the adjustment of the propeller blades 4 and 5 remains unchanged. This applies to the case in which the shaft 11 is not shifted in the longitudinal direction.

If the angle of attack of the propeller 4, 5 is to be varied, the shaft 11 must be shifted in its longitudinal direction by a corresponding amount. This results in a rotation of the shaft 11 relatively to the gear 13. This rotation is transmitted to the bevel gear 8 through the gears 10 and 9, that is to say, the bevel gear 8 is rotated relatively to the shaft 3 in the one or the other direction, depending upon the direction of displacement of the shaft 11, with the result that the angle of attack of the propeller blades 4 and 5 is altered correspondingly. By a displacement of the shaft 11 it is, therefore, possible to change the angle of attack of the propeller during its rotation.

As above described the angle of attack is varied in accordance with a speed governor. This consists in the embodiment shown of a centrifugal governor 15 which is secured to the shaft 3 as indicated at 15a and which with increasing speed shifts the plate 15b in the direction of the shaft 3 opposite to the action of the spring 15c. In order that the movements of the plate 15b may cause corresponding variations in the angle of attack of the propeller, a hydraulic or pneumatic servo-motor arrangement is provided consisting of the servo-motor 16 and of the regulating slide valve 17. The one end of the piston rod 16a of the servo-motor 16 and the end of the shaft 11 provided with a flange 11c are coupled in the longitudinal direction without any appreciable clearance in such a manner as to permit the shaft 11 of rotating relatively to the piston rod 16a. The one end of the piston rod 17a of the slide valve 17 engages the plate 15b in a similar manner so that the plate 15b is, therefore, not prevented from rotating and that nevertheless displacements of the plate 15b in the direction of the shaft 3 cause corresponding displacements of the piston rod 17a and of the pistons 17b and 17c of the slide valve.

In order to vary the regulating value to be maintained constant by the governor, the casing of the slide valve 17 is so arranged on guide blocks 18 and 19 as to slide in the direction of the piston rod 17a. The casing of the slide valve 17 carries a gear rack 17d meshing with a gear segment 17f pivotally mounted as indicated at 17e. The gear segment 17f may be rocked opposite to the action of the spring 17g with the aid of a control line 20 by means of the adjusting device 34 arranged preferably at the pilot seat. Rocking the gear segment 17f causes, as will be readily apparent, an adjustment of the casing of the slide valve 17. Since the slide valve 17 is slidably arranged, flexible conduits must be employed for the conduits 22 and 23 leading to the servo-motor 16.

24 denotes the conduit through which the aero-engine 2 is supplied with gas mixture, the conduit being enlarged as indicated at 25. Within the space thus enlarged there is a gas-tight diaphragm capsule 26 of the same type as those employed in barometers etc. The diaphragm capsule is evacuated to such as extent that it is sufficiently sensitive in the fluctuations of the pressure of the gas mixture flowing through the space 25, i. e., its expansion is increased or decreased in accordance with the gas pressure. The one end of the diaphragm capsule 26 is secured to a rod 27 which is guided in the wall of the casing 25 in a manner as tight as possible. The one end of the piston rod 28a of a slide valve 28 serving to control the servo-motor 29 is secured to the other end of the diaphragm capsule 26. The servo-motor 29 cooperates with a throttle 30 placed in a conduit 31 through which the air is supplied to the carburettor or to the blower feeding the engine.

The regulating value to be maintained constant by the charging pressure regulator may be varied by shifting the rod 27 in its longitudinal direction. To this end, the rod 27 is connected by a pivot joint with one end of a lever 32 pivotally mounted as indicated at 32a. The other end of the lever 32 which is under the influence of a spring 35 may be adjusted through a control line 33 by means of the adjusting device 34. This adjusting device 34 contains as electrically operated drum 60 to which the end of the controlling line 33 is secured. The device 34 is constructed similar to the device shown in Figure 6, so far as the elements 50 to 59 and 62 to 64 of that figure are concerned, and includes an electric motor for driving the drum 60, an altimeter for controlling the motor and a flexible shaft 65 with a crank handle 66 and a scale 77 for adjusting the altitude which is to be maintained automatically.

The operation of the arrangement, as far as it is shown in Figure 1, is as follows:

It may be assumed that the device is in operation and both the speed and the charging pressure correspond to the values to be maintained constant. In this case the pistons of the slide valve 17 and of the slide valve 28 respectively are in the zero position illustrated. If the speed now should increase or decrease for any reason whatever, the plate 15b of the centrifugal governor 15 will move and operate the servo-motor 16 in the one or the other direction, to shift the shaft 11 lengthwise and thus cause a partial rotation of said shaft relatively to the wheel 13, whereby the wheel 9 will be given a partial rotation relatively to the wheel 14, resulting in a change in the angle of attack of the propeller until the desired speed is again attained and the slide valve 17 returns to the zero position. If the speed to be maintained constant is to be increased or decreased, the adjusting device 34 is actuated in a corresponding manner, with the result that the casing of the slide valve 17 is shifted in the one or the other direction and the servo-motor 16 is put into operation accordingly. Thereupon the angle of attack of the propeller is varied until the pistons of the slide valve 17 reach the zero position with respect to the corresponding cylinder owing to the change in speed caused by the variation of the angle of attack.

If the charging pressure varies the expansion of the diaphragm capsule 26 is increased or decreased in the direction of the rod 28*a* with the result that the servo-motor 29 adjusts the throttle 30 until the desired value of charging pressure is again established.

If it is desired to change the value to be maintained constant by the charging pressure regulator, the adjusting device 34 is actuated by actuating the crank handle 66 until the pointer of scale 77 shows the new altitude to be maintained constant. This adjustment has the result that the slide valve 28 is actuated by the displacement of the rod 27 thus putting the servo-motor 29 into operation. The latter adjusts the throttle 30 until the regulating slide valve 28 has returned to the zero position through the change in pressure prevailing in the chamber 25. Details of the adjusting device 34 and of its operation are described hereinafter with reference to Fig. 6.

As above described the regulating device according to the invention is particularly advantageous when used in connection with multi-engined aeroplanes. Fig. 2 illustrates a multi-engined aeroplane embodying my invention. The aeroplane 40 is equipped with four engines 41, 42, 43, and 44. Since the regulating device for the individual engines and the design of the corresponding propeller may be the same as in the embodiment shown in Fig. 1, the details thereof are not shown in Fig. 2. It is preferable to employ, as shown in Fig. 2, a common adjusting device 45 for the adjustment of the regulating values to be maintained constant by the charging pressure regulator, and a common adjusting device 46 for the adjustment of the regulating values to be maintained by the speed governor. Figs. 3 and 4 illustrate a top view of these adjusting devices and Fig. 5 shows a front elevational view thereof. As will be seen from these figures the adjusting device consists of a drum 45*a* or 46*a* respectively to which the ends of the control lines are secured and which are adjustable by a crank 45*b* or 46*b* respectively according to a scale arranged on the disc 45*c* or 46*c* respectively. The adjusting devices 45, 46 are arranged at the pilot seat.

The common adjusting devices for the engines 41 to 44 have the advantage that all engines are always adjusted to the same speed value to be maintained constant. This is very important in order to prevent the occurrence of oscillations caused by variations of the speeds of the engines. The adjusting device 45 in Figures 2, 3, and 5 consists of or forms part of the automatic control device as will be pointed out later.

The automatic controlling device to be used as adjusting device 34 in Figure 1, and 45 in Figure 2, or in connection therewith, is designed to regulate the power of the engines in accordance with the height of flight so as to maintain constant a predetermined height of flight. This presupposes that the power of one engine—or if the aeroplane is equipped with several engines, if desired, also the power of the several engines—be regulated in accordance with a device responsive to changes in the height or altitude of the aeroplane, for instance an altimeter. In connection with an altimeter, an adjusting device may be provided to set the regulating value to be automatically maintained. This may be accomplished by the embodiment shown in Fig. 6. The altimeter 50 is designed in the form of a barometer, i. e., it comprises as the most essential part thereof a wholly or partially evacuated chamber 50*a* which is closed by a diaphragm 50*b*. As is well known variations of the air pressure cause a corresponding variation of the distance of the central portion of the diaphragm from the bottom of the chamber 50*a*. A contact arm 50*d* is pivotally mounted as indicated at 50*c* and oscillates with one end thereof between two counter-contacts 51 and 52. These counter-contacts are secured to a worm wheel segment 53 which is actuated by the electric motor 59 through the worm 54, the shaft 55, the bevel gears 56 and 57 and the shaft 58. The motor 59 is, furthermore, in operative connection with a drum 60 to which are secured the ends of four control lines 61 which serve to adjust the regulating value to be maintained by the charging pressure regulator as disclosed in Figs. 1 and 2.

The contact arm 50*d* extends into the casing of the altimeter 50 and, on the one hand, cooperates with the diaphragm 50*b* through an intermediate piece 62 and, on the other hand, with a spring 63. The other end of the spring is secured to a spindle 64 which cooperates with a nut arranged in the wall of the casing of the altimeter 50 and may be adjusted on the scale from the pilot seat through a flexible shaft 65 by means of the crank handle 66. The scale 77 is preferably calibrated in heights. The motor 59 is a reversing motor and is switched in in the one or the other direction depending upon whether the contact 50*d* comes into engagement with the counter-contact 51 or 52.

The operation is as follows:

At the beginning of or during the flight the crank handle 66 is rotated until the stationary pointer 77*a* indicates the desired height of flight on the scale 77. Such rotation shifts the spindle 64 lengthwise to adjust the tension of the spring 63. If this desired height of flight is greater than the height of flight actually attained at the moment in question the contact arm 50*d* owing to the actuation of the handle 66 comes into engagement with one of the counter-contacts 51 and 52. The motor 59 is switched in in one direction of rotation and the regulating value to be maintained by the charging pressure regulator is increased to the required extent. The parts 51 to 58 form in this case the well-known transmission arrangement employed in regulating devices.

The same operation will take place if the actual height of flight differs from the desired height of flight, for instance, as the result of a gust. In this case also, the contact arm 50*d* comes into engagement with one of the counter-contacts 51, 52 depending upon the departure from the desired height of flight; accordingly the motor 59 is switched in in the one or the other direction of rotation.

It is to be understood that the device shown in Fig. 6 can also be used in combination with the arrangement of Fig. 2. In this case, the whole device of Fig. 6 takes the place of device 45 in Fig. 2 so that drum 60 replaces the drum 45a, and handle 66 and scale 77 replace parts 45b and 45c (Figs. 3 and 5) of device 45.

The adjusting device 34 in conjunction with the rack 17d and the parts connecting them constitute a device for changing the setting of the governor 15. Similarly, the adjusting device 34 in conjunction with the rod 27 and the parts connecting them constitute a device for changing the setting of the pressure-responsive means 26. Again, in Fig. 6 the altimeter 50 constitutes means responsive to pressure, such means being set according to the tension of the spring 63, and the parts 64, 65, 66, 77, 77a constitute a device for changing the setting of said pressure-responsive means.

I claim as my invention:

1. In an aircraft having a driving propeller of variable pitch, the combination of an internal combustion engine for driving said propeller, said engine having a connection for supplying a gaseous driving medium thereto at a variable charging pressure and controlling means for varying said charging pressure, means for governing the pitch of said propeller for maintaining said engine at a constant speed, a device responsive to changes in the altitude of said aircraft, said device being operatively connected with said controlling means so as to adjust said charging pressure in response to changes in altitude in order to maintain a predetermined altitude of said craft by said adjustment of the charging pressure.

2. In an aircraft having a driving propeller designed to be operated with variable pitch, the combination of an internal combustion engine disposed to drive said propeller and designed to be supplied with a gaseous fuel of variable charging pressure, a device for governing the pitch of said propeller so as to maintain said engine at a constant speed, means for controlling said charging pressure, an altimeter operatively connected with said controlling means so as to adjust said charging pressure in response to changes in altitude in order to maintain a predetermined altitude by said adjustment.

3. In an aircraft having a driving propeller designed to be operated with variable pitch, the combination of an internal combustion engine disposed to drive said propeller and designed to be supplied with a gaseous fuel of variable charging pressure, means for governing the pitch of said propeller so as to maintain said engine at a constant speed, means for controlling said charging pressure, a device responsive to changes in altitude of said aircraft, said device being operatively connected with said controlling means in order to adjust that charging pressure responsive to changes in altitude so as to maintain a predetermined altitude, and means for changing the setting of said device so as to adjust the altitude to be maintained.

4. In an aircraft, the combination of an internal combustion engine for driving said craft having a connection for supplying a gaseous driving medium at a variable charging pressure, a governor for automatically maintaining said engine at a constant speed, means for controlling said charging pressure, an altimeter operatively connected with said controlling means in order to change said charging pressure according to changes in the altitude of said aircraft so as to maintain a predetermined altitude, and a device for altering the setting of said altimeter.

5. In an aircraft, the combination of a plurality of variable pitch propellers for driving said craft, a plurality of internal combustion engines each being connected to one of said propellers and designed to be supplied with a gaseous driving medium of variable charging pressure, means for governing the pitch of said propellers for maintaining said engines at a constant speed, a device responsive to changes in the altitude of said aircraft, and a plurality of individual means for controlling the charging pressure at said engines, each of said means being allotted to one of said engines and operatively connected with said device so as to adjust said charging pressure in response to changes in altitude in order to maintain said craft at a predetermined altitude.

6. In a propeller-driven aircraft, the combination of a plurality of internal combustion engines for driving the propellers of said craft, each engine having a connection for supplying a gaseous driving medium thereto at a variable charging pressure and means for controlling said charging pressure, governor operated means for maintaining said engines at a constant speed, an altimeter operatively connected with said controlling means for adjusting the charging pressure at the respective engines in response to changes in the altitude of said aircraft so as to maintain a predetermined altitude.

7. In an aircraft having a variable pitch propeller and an internal combustion engine for driving said propeller, in combination, means for supplying said engine with a gaseous driving medium of variable charging pressure, pressure-regulating means for maintaining said charging pressure at a constant value, mechanism for governing the pitch of said propeller so as to maintain said propeller at a constant speed, a device for adjusting said governing mechanism as to the speed to be kept constant, a device for adjusting said pressure-regulating means, and control means responsive to a condition of flight, said control means being operatively connected with one of said adjusting devices for setting said latter adjusting device so as to maintain said engine at a constant power independent of changes in said condition of flight.

8. In an aircraft having a variable pitch propeller and an internal combustion engine for driving said propeller, in combination, means for supplying said engine with a gaseous driving medium of variable charging pressure, pressure-regulating means for maintaining said charging pressure at a constant value, mechanism for governing the pitch of said propeller so as to maintain said propeller at a constant speed, a device for adjusting said governing mechanism as to the speed to be kept constant, and a control device responsive to a condition of flight, said control device being operatively connected with said pressure-regulating means for adjusting said latter means so as to maintain the power of said engine at a constant value independent of changes in said condition of flight.

9. In an aircraft having a variable pitch propeller and an internal combustion engine for driving said propeller, in combination, means for supplying said engine with a gaseous driving medium of variable charging pressure, pressure-regulating means for maintaining said charging pressure constant at an adjusted value, and governing means for controlling the pitch of said propeller so as to maintain the speed of said propeller at an adjusted value, said pressure-regulating means and said governing means being adjusted to maintain the power of said engine constant at a maximum value.

10. In an aircraft having a variable pitch propeller and an internal combustion engine for driving said propeller, the combination of means for supplying said engine with gaseous fuel of variable charging pressure, pressure-regulating device for maintaining said charging pressure at a constant value, a setting device for adjusting said pressure-regulating device, hydraulic drive, a valve for controlling said drive, a connection between said valve and said setting device, and another connection between said drive and said pressure regulating device, in combination with a speed-responsive governor connected with said engine, means for varying the pitch of said propeller, an hydraulic drive interposed between said governor and said pitch-varying means, said latter drive also having a control valve, another setting device connected with said latter valve for setting a speed value to be kept constant by said governor and said pitch-varying means, and a control device responsive to a condition of flight forming part of one of said connections so as to superpose on the appertaining valve an additional control adjustment independent of said setting means, said two setting means being manually adjustable and located at the pilot's seat, whereby the power output is automatically kept constant at a selectable value to be set by the pilot.

11. In an aircraft having a variable pitch propeller with means for adjusting the propeller blades and an internal combustion engine for driving said propeller, in combination, means for supplying said engine with a gaseous medium of a predetermined charging pressure, pressure-regulating means for maintaining said pressure constant at said predetermined value, said regulating means being responsive to the variations of said charging pressure, controlling means for adjusting the base value of said charging pressure, means for maintaining the speed of the propeller constant including a speed governor controlling the speed of the propeller, said governor cooperating with said adjusting means of the propeller blades, and means for varying the base value of said speed governor.

12. In an aircraft having a variable pitch propeller and an internal combustion engine for driving said propeller, in combination, means for supplying said engine with gaseous fuel of variable charging pressure, pressure-regulating means for maintaining said charging pressure constant at an adjusted value, and governing means for controlling the pitch of said propeller so as to maintain the speed of said propeller at an adjusted value, said pressure-regulating means and said governing means being adjusted to maintain the power of said engine constant at a predetermined value.

PAUL EDUARD KÖSTER.